United States Patent
Guan et al.

(10) Patent No.: US 9,886,251 B2
(45) Date of Patent: *Feb. 6, 2018

(54) OPTIMIZED COMPILING OF A TEMPLATE FUNCTION

(71) Applicant: International Business Machines Corporation, Armonk, NY (US)

(72) Inventors: Xiao Feng Guan, Shanghai (CN); JiuFu Guo, Shanghai (CN); Jin Song Ji, Ponte Vedra, FL (US); Jia Bing Liu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/286,775

(22) Filed: Oct. 6, 2016

(65) Prior Publication Data

US 2017/0168789 A1 Jun. 15, 2017

Related U.S. Application Data

(63) Continuation of application No. 15/053,115, filed on Feb. 25, 2016, now Pat. No. 9,524,153, which is a continuation of application No. 14/964,646, filed on Dec. 10, 2015.

(51) Int. Cl.
*G06F 9/45* (2006.01)
(52) U.S. Cl.
CPC .............. *G06F 8/443* (2013.01); *G06F 8/447* (2013.01)
(58) Field of Classification Search
CPC ........... G06F 8/443; G06F 8/445; G06F 8/447
USPC ......................................................... 717/151
See application file for complete search history.

(56) References Cited

U.S. PATENT DOCUMENTS

| | | | | |
|---|---|---|---|---|
| 6,041,180 A * | 3/2000 | Perks | ........ | G06F 8/54 717/151 |
| 8,312,425 B2 * | 11/2012 | Hepper | ...... | G06F 8/71 717/104 |
| 8,336,032 B2 * | 12/2012 | Bates | ........ | G06F 11/3644 717/129 |
| 8,584,107 B2 | 11/2013 | Skaistis | | |
| 8,631,385 B2 | 1/2014 | Ali | | |
| 8,819,650 B2 * | 8/2014 | Barcia | ...... | G06F 9/4433 717/147 |
| 8,904,370 B2 * | 12/2014 | Perry | ....... | G06F 8/41 717/151 |
| 9,524,153 B1 | 12/2016 | Guan et al. | | |
| 2009/0254893 A1 | 10/2009 | Ahuja et al. | | |

(Continued)

OTHER PUBLICATIONS

List of IBM Patents or Patent Applications Treated as Related, Appendix P, Filed Herewith.

(Continued)

*Primary Examiner* — Anna Deng
(74) *Attorney, Agent, or Firm* — Edward J. Wixted, III

(57) ABSTRACT

A template function is received. The template function includes one or more data types. A single abstract instantiation of the template function is created. An abstract internal descriptor for each data type is created. A map set for each abstract internal descriptor is created. The number of instantiations required and the type of instantiation required is provided. A finished object is created using each map set. The finished object is a translation of the intermediate representation into assembly code.

1 Claim, 3 Drawing Sheets

(56) References Cited

U.S. PATENT DOCUMENTS

2016/0078084 A1 3/2016 Freedman et al.
2017/0123773 A1 5/2017 Gao et al.

OTHER PUBLICATIONS

Guan et al., "Optimized Compiling of a Template Function", U.S. Appl. No. 14/964,646, filed Dec. 10, 2015, 21 pages.
Guan et al., "Optimized Compiling of a Template Function", U.S. Appl. No. 15/286,727, filed Oct. 6, 2016, 17 pages.

* cited by examiner

OPTIMIZED COMPILING OF A TEMPLATE FUNCTION

BACKGROUND OF THE INVENTION

The present invention relates generally to the field of compiling source code, and more particularly to optimizing the compiling of a template function.

A compiler is a program, or set of programs, that transforms source code written in a programming language (i.e., the source language) into another computer language (i.e., the target language, often having a binary form known as object code). A common reason for converting source code is to create an executable program. More generally, a compiler is a specific type of translator.

A template function behaves like a standard function except that the template can have data of many different types; each data type may have one or more parameters. In other words, a template function represents a family of functions. A template function allows a programmer to code a single function to work on multiple data types which results in the compiler executing the function on the various data types rather than the programmer writing individual functions for each data type.

SUMMARY

Embodiments of the present invention include a method, computer program product and computer system for optimized compiling of a template function. In one embodiment, a template function is received by one or more computer processors. The template function includes one or more data types. A single abstract instantiation of the template function is created. An abstract internal descriptor for each data type is created. A map set for each abstract internal descriptor is created. The number of instantiations required and the type of instantiation required is provided. A finished object is created using each map set. The finished object is a translation of the intermediate representation into assembly code.

DETAILED DESCRIPTION

Some embodiments of the present invention recognize that compiling software is an important aspect of creating an executable program. Steps in compiling include 'front-end' analysis (i.e., lexical analysis, syntax analysis, and semantic analysis), intermediate code generation, and 'back-end' synthesis (i.e., optimization and code generation). Embodiments of the present invention recognize that compiling a template function may be time consuming and compiler resource intensive depending upon how many different data types (characters, integers, floats, doubles, strings, arrays, etc.) the template function includes.

Embodiments of the present invention recognize that there may be many economical ways to compile a template function. Creating a single, abstract instantiation of the template function allows for one back-end optimization (rather than one optimization cycle for each data type in the template function). An abstract instantiation is an instance of an object which includes only essential characteristics of the object. Non-relevant information concerning the object is removed or hidden by the programmer in order to reduce complexity of the object and to increase efficiency. In the class-based object-oriented programming paradigm, "object" refers to a particular instance of a class where the object can be a combination of variables, functions, and data structures. Running just one optimization cycle may enable the compiler to complete the process quicker. Additionally, late optimization may be done, using an optimized alias set from the abstract instantiation. The late optimization saves compiler resources. Using fewer resources may decrease the chance of a compiler fault or error.

Figure 1:
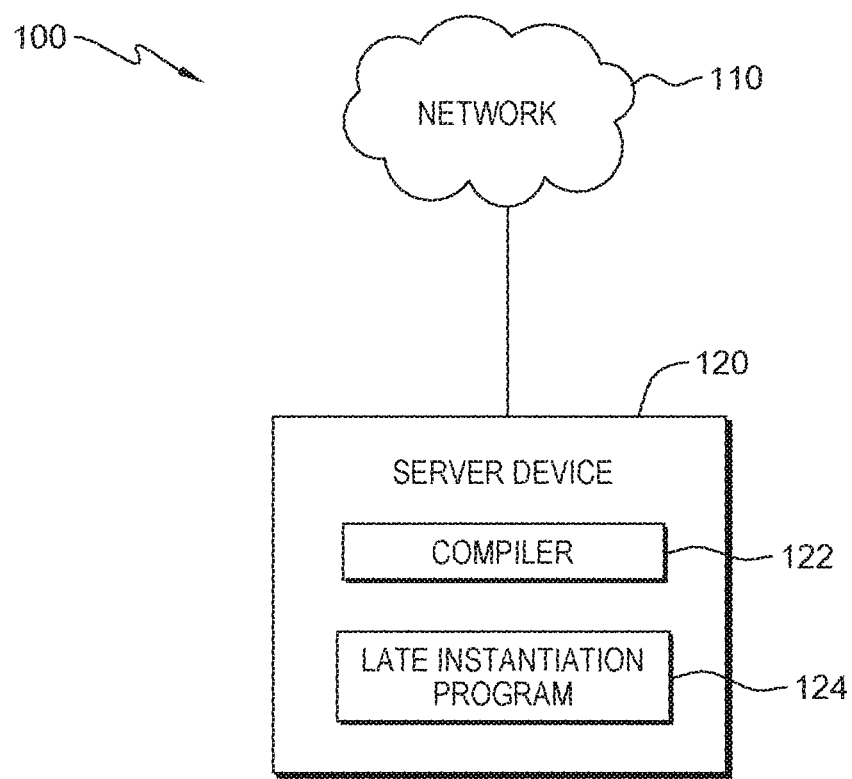
FIG. 1 is a functional block diagram of a computing environment, in accordance with an embodiment of the present invention.

The present invention will now be described in detail with references to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes server device 120 connected to network 110. In an example embodiment, server device 120 may communicate with any other device(s) (not shown) utilizing network 110. In example embodiments, computing environment 100 can include other computing devices not shown such as smartwatches, cell phones, smartphones, phablets, tablet computers, laptop computers, desktop computers, other computer servers or any other computer system known in the art.

In example embodiments, server device 120 may connect to network 110 which enables server device 120 to access other computing devices and/or data not directly stored on server device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between server device 120 and other computing devices (not shown) within computing environment 100, in accordance with embodiments of the present invention.

In various embodiments of the present invention, server device 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, server device 120 represents a computer system utilizing clustered computers and components (e.g., database server computers, application server computers, etc.) that act as a single pool of seamless resources when accessed by elements of computing environment 100 (not shown). In general, server device 120 may be representative of any electronic device or combination of electronic devices capable of executing computer readable program instructions. Server device 120 may include components as depicted and described in further detail with respect to FIG. 3, in accordance with embodiments of the present invention.

According to an embodiment of the present invention, server device 120 includes compiler 122 and late instantiation program 124. In an alternative embodiment, compiler 122 and late instantiation program 124 may be found on any other devices connected to network 110.

Compiler 122 is a computer program (or set of programs) that transforms source code written in a programming language (the source language) into another computer language (the target language, often having a binary form known as object code). The most common reason for converting a source code is to create an executable program. The name "compiler" is primarily used for programs that translate source code from a high-level programming language to a lower level language (e.g., assembly language or machine code). If the compiled program can run on a computer whose CPU (central processing unit) or operating system is different from the one on which the compiler runs, the compiler may be known as a cross-compiler. More generally, compilers may be considered to be a specific type of translator. A compiler is likely to perform many or all of the following operations: lexical analysis, preprocessing, parsing, semantic analysis (syntax-directed translation), code generation, and code optimization. Program faults caused by incorrect compiler behavior can be very difficult to track down and work around. Compiler programmers, therefore, invest significant effort to ensure compiler correctness.

According to embodiments of the present invention, late instantiation program 124 is included on server device 120 as a stand-alone program. In other embodiments, late instantiation program 124 may be found on any other device (not shown) within computing environment 100. In yet another embodiment, compiler 122 may execute the function of late instantiation program 124. Late instantiation program 124 may be a program, subprogram of a larger program, application, and plurality of applications which optimizes the compiling of a template function. In one embodiment of the present invention, late instantiation program 124 creates a single, abstract instantiation of a template function. After optimization of the abstract instantiation, the abstract instantiation is processed through late instantiation which creates the necessary template function object.

Figure 2:
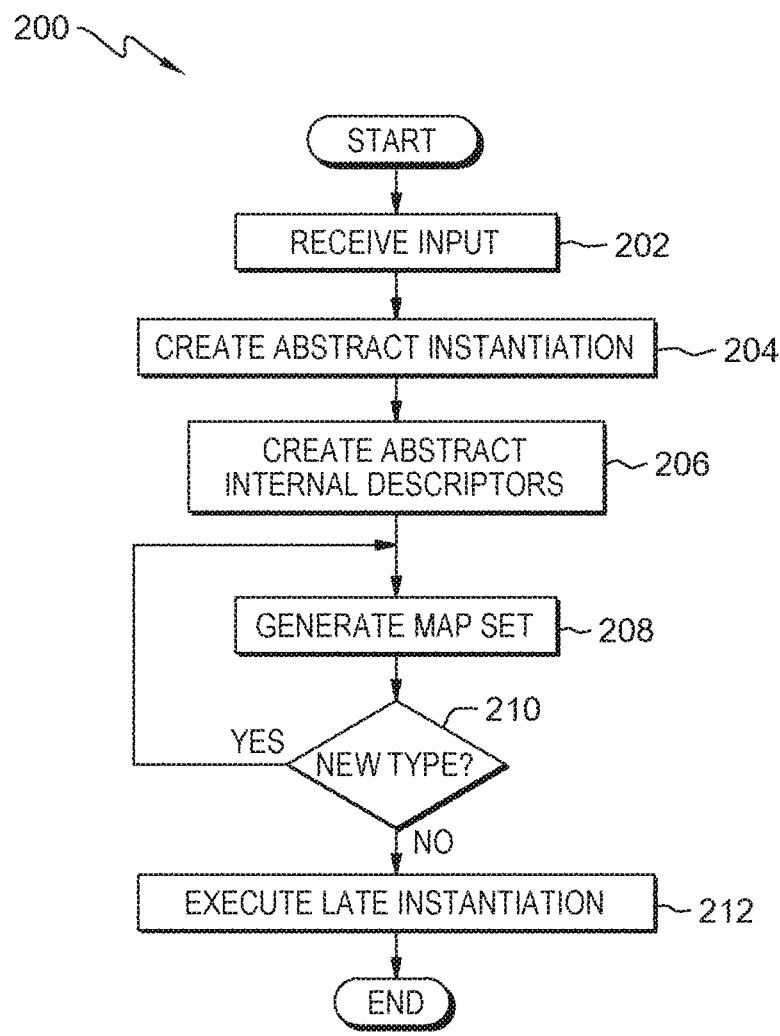
FIG. 2 is a flowchart depicting operational steps of a program that functions to optimize the compiling of a template function, in accordance with an embodiment of the present invention.

FIG. 2 is a flowchart of workflow 200 depicting operational steps for optimizing the compiling of a template function, in accordance with an embodiment of the present invention. In one embodiment, the steps of the workflow are performed by late instantiation program 124. In another embodiment, compiler 122 may perform the steps of workflow 200. In an alternative embodiment, any other program working with late instantiation program 124 may perform steps of workflow 200. In an embodiment, late instantiation program 124 may invoke workflow 200 upon a user requesting optimized compiling of a template function. In an alternative embodiment, late instantiation program 124 may invoke workflow 200 upon a user running source code through compiler 122.

Late instantiation program 124 receives input (step 202). In other words, late instantiation program 124 receives the input of a template function which needs to be compiled. A template function behaves like a standard function except that the template can have data of many different types; each data type may have one or more parameters. In an embodiment of the present invention, server device 120 receives source code containing a template function from a user. For example, a user creates a template function named 'SUM" to add two variables together (e.g., $V_1+V_2=X$). The template function 'SUM' includes the following four data types: integer; decimal; float; and double and each data type may have one or more attributes.

Late instantiation program 124 creates an abstract instantiation (step 204). In other words, late instantiation program 124 creates a single, abstract instantiation for the template function at the intermediate language level. An abstract instantiation is a function template in the intermediate language form (output from the front-end of a compiler). Except for the template function code, the template parameters in the source code are converted into the abstract type, which also includes information about mapping from the abstract type to the target type. An abstract instantiation would be instantiated later by the compiler back-end. In one embodiment, late instantiation program 124 creates the abstract instantiation in conjunction with compiler 122. For example, a single instantiation is created for the four data types rather than one instantiation each for the integer, decimal, float, and double data types.

Late instantiation program 124 creates abstract internal descriptors (AIDs) (step 206). In other words, late instantiation program 124 abstracts the differences between the four data types in the template function, which are represented by symbols with various attributes in the compiler, and creates the abstract internal descriptors for each unique template parameter (i.e., the parameters for the data types included in the template function). An AID is an internal symbol with undefined contents, generated in the front-end portion of the compiler and used in the back-end of the compiler. A symbol in computer programming is a primitive data type whose instances have a unique human-readable form. Symbols may be used as identifiers. The front-end of the compiler treats the template function as a normal function with undefined type parameters to generate an intermediate representation (IR) for the back-end of the compiler. In an embodiment of the present invention, late instantiation program 124 creates the template function AIDs in the front-end of compiler 122. For example, an AID is created for the integer data type, another for the decimal data type, another for the float data type, and another for the double data type.

Late instantiation program 124 generates a map set (step 208). In other words, late instantiation program 124 generates a map set for the template function AIDs. The map set may serve as the link between the template function and the template function parameters. The map set may create the association between a given AID to the real symbols that AID represents. The fully completed map set may provide the back-end of the compiler information such as how many instantiations are required from the abstract instantiation and what type of instantiations are required after back-end optimization. In one embodiment, late instantiation program 124 generates the initial map set. For example, a map set is generated between the AIDs of the 'SUM' template function and the data type 'integer'.

Late instantiation program 124 displays whether a new data type was found (decision step 210). In other words, late instantiation program 124 displays whether another data type is found in the template function. The number of template instantiations determines the number of new data types which should be added into the mapping set for a given AID. In one embodiment (decision step 210, YES branch), a new data type is found; therefore, late instantiation program 124 returns to step 208 to generate a new AID mapping set for the new data type and adds the new AID mapping set to the overall template function AIDs mapping set. In another embodiment (decision step 210, NO branch), a new data type is not found; therefore, late instantiation program 124 proceeds to step 212.

Late instantiation program 124 executes late instantiation (step 212). In other words, following normal optimization by compiler 122, late instantiation program 124 utilizes the abstract instantiations from the compiler front-end to translate the IR into assembly code to create the finished object. In one embodiment, late instantiation program 124 and compiler 122 create the final object. For example, the executable file to sum the four individual data types (i.e., integer, decimal, float, and double data) is created.

Figure 3:
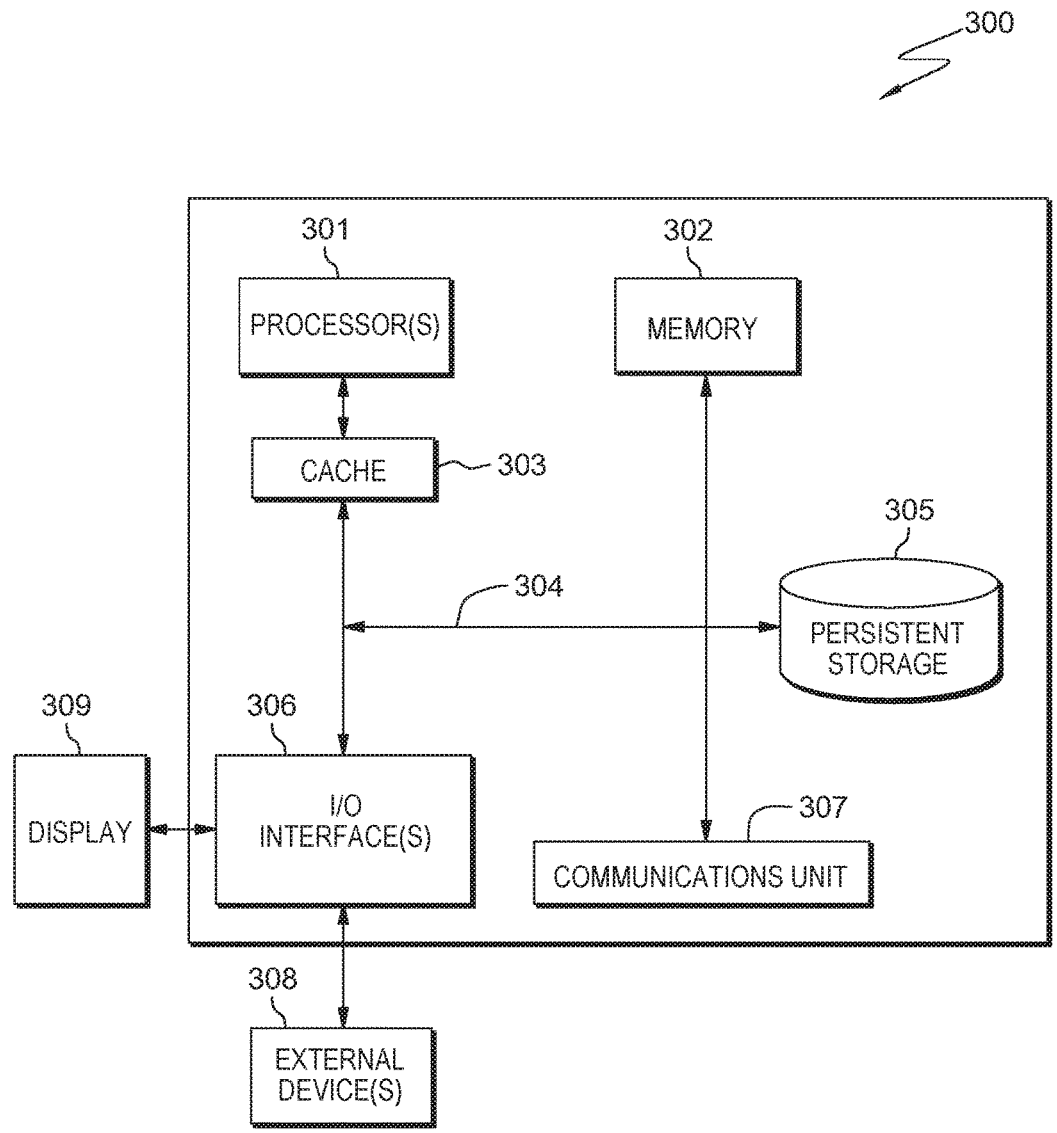
FIG. 3 depicts a block diagram of the components of a computing system representative of the server device of FIG. 1, in accordance with an embodiment of the present invention.

FIG. 3 depicts computer system 300 which is an example of a system that includes compiler 122 or late instantiation program 124. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for optimized compiling of a template function, the computer system comprising:
   one or more computer processors;
   one or more computer readable non-transitory storage media; and
   program instructions stored on the one or more computer readable non-transitory storage media for execution by at least one of the one or more computer processors, the program instructions comprising:
   program instructions to receive the template function, wherein the template function includes one or more data types;
   program instructions to create a single abstract instantiation for the template function;
   program instructions to create an abstract internal descriptor for each unique parameter found in the template function, wherein the each unique parameter consists of parameters for each of the one or more data types included in the template function, and wherein the each unique parameter for the each data type of the one or more data types is represented by symbols with various attributes in a compiler, and wherein the abstract internal descriptor is an internal symbol with undefined contents;
   program instructions to generate a map set for the one or more created abstract internal descriptor, wherein the map set is a link between the template function and the parameters in the template function, and wherein the map set provides one or more of the following: the number of instantiations required from the single abstract instantiation and what type of instantiations are required; and
   program instructions to create a finished object using the generated map set, wherein the finished object is a translation of an intermediate representation into assembly code and the finished object is an executable file, wherein the program instructions to create the finished object comprises:
   program instructions to execute a single back-end compiler optimization of a single front-end compiler abstract instantiation, wherein the front-end compiler abstract instantiation and the back-end compiler optimization are steps for converting a source code into the executable file; and program instructions to create the executable file via late instantiation of an optimized abstract instantiation.

\* \* \* \* \*